Dec. 1, 1936.  A. O. SAMUELS  2,062,941

CORN POPPER

Filed July 22, 1935

INVENTOR
ABE O. SAMUELS
BY
ATTORNEY

Patented Dec. 1, 1936

2,062,941

UNITED STATES PATENT OFFICE 2,062,941

CORN POPPER

Abe O. Samuels, Rochester, N. Y., assignor to Samson-United Corporation, Rochester, N. Y.

Application July 22, 1935, Serial No. 32,492

15 Claims. (Cl. 53—4)

This invention relates to electrically heated and electrically operated corn poppers and has for one of its objects to provide a novel construction for such a device.

Another object of this invention is to provide an electrically operated corn popper with a novel means for keeping the corn kernels in movement.

Figure 1:
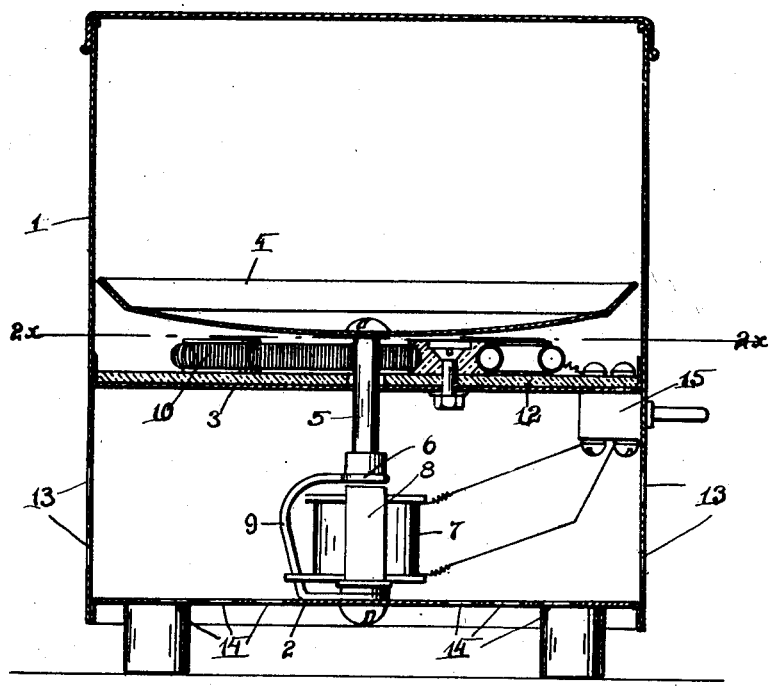

These and other objects and attendant advantages of this invention will become more readily apparent from the detailed description thereof which follows, reference being had to the accompanying drawing in which Figure 1 is a vertical sectional view of the novel corn popper.

Figure 2:
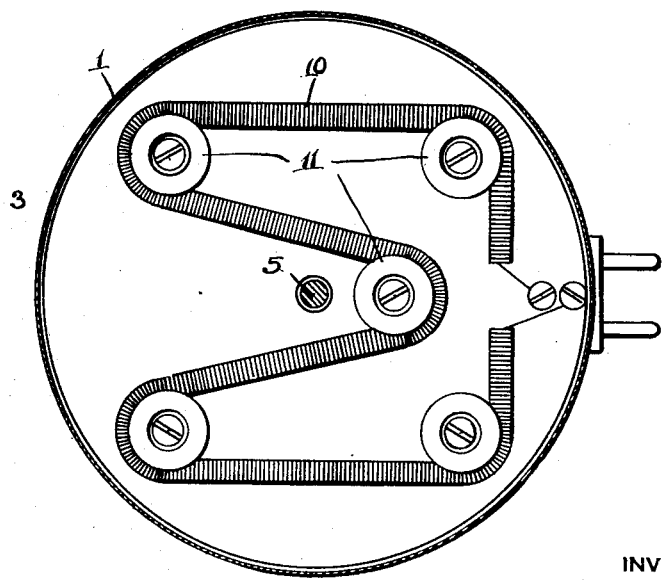

Figure 2 is a horizontal sectional view of the corn popper, the section being taken on the line $2x$—$2x$ of Figure 1.

In the figures like reference numerals indicate like parts.

The electrically heated and electrically operated corn popper, forming the subject matter of this invention, comprises the container 1 which is provided with a bottom in the form of a supporting diaphragm 2. A supporting shelf 3 is mounted within the container suitably spaced from the bottom or diaphragm 2 and above the shelf is located the pan 4 on which the corn is popped.

The pan 4 is dished and is supported on a central supporting stem 5 which extends thru the shelf 3 and is mounted on the armature 6 of a vibrator. This vibrator comprises a suitable field coil 7 for the purpose of consecutively energizing and de-energizing the poles 8 of the vibrator when the coil is connected to an alternating or pulsating current. The armature 6 is provided at the end of a spring bracket 9 which extends from the bottom of the vibrator and overhangs the top thereof to keep the armature suspended and properly spaced from the poles 8. The entire vibrator, including the armature supporting bracket and the field coil with its poles, is centrally mounted on the bottom 2 which is constructed so as to provide a yielding diaphragm which will react to the vibrations of the vibrator so as to cause it to vibrate on the operation of the vibrator. In this way the vibrator operates not only its armature but also its support and in so doing causes a manifold increase of the action of the vibrator on the pan 4 mounted on top of the stem 5.

The pan 4 is heated for the popping of the corn by means of an electric heating coil 10 which is supported on the shelf 3 by a series of insulating spools 11, 11. The supporting shelf is covered by a suitable heat resisting covering 12 made up of asbestos or other suitable material to shield the vibrator from the heat generated by the heating unit. In the wall of the container below the shelf 3 thereof are provided suitable vent holes 13, 13 and these are supplemented by suitable vent holes 14, 14 in the diaphragm bottom 2 on which the vibrator is supported. These vent holes allow air to freely circulate thru the portion of the container in which the vibrator is located so as to cool the field coil of the vibrator during the operation thereof.

The electrical connection for the vibrator and heating coil is made thru the connector block 15 which is located within the container and is so constructed that an electrical connection may be made with a suitable extension cord on the outside of the container and the vibrator and heating coil connected to the connector block on the inside thereof.

In the operation of the corn popper the corn kernels to be popped or exploded are placed in the pan and the pan heated and vibrated with the kernels. The vibration of the pan causes the kernels to continually jump within the pan so as to keep them moving to prevent a burning or scorching thereof. The pan is dished so that the kernels will automatically gravitate toward the low point of the pan and thus assist in the movement of the kernels to keep them from burning during the popping thereof.

I claim:

1. In a corn popper the combination of a container, a separate pan within said container and means for vibrating said pan.

2. In a corn popper the combination of a receptacle, a separate pan within said receptacle, heating means below said pan and means for vibrating said pan.

3. In a corn popper the combination of a receptacle, a separate pan within said receptacle, means for vibrating said pan, and fixed heating means located below said pan to heat said pan during the vibration thereof.

4. In a corn popper the combination of a receptacle, a separate pan within said receptacle, vibrating means in said receptacle and connected to said pan, and heating means interposed between said pan and said vibrating means.

5. In a corn popper the combination of a receptacle, a diaphragm in the bottom of said receptacle, a vibrator supported on said diaphragm, and a separate pan within said receptacle and operated by said vibrator.

6. In a corn popper the combination of a container having a bottom, a shelf within said container and spaced from said bottom, a vibrator mounted between said bottom and said shelf, a supporting member carried by said vibrator and projecting thru said shelf, a separate pan mounted on said supporting member within said container, and a heat unit mounted on said shelf below said pan.

7. In combination with a vibrator, a pan operatively supported by said vibrator, and a yielding supporting member for said vibrator so as to increase the vibrating effect of said vibrator on said pan.

8. A corn popper comprising a container, an insulating partition intermediate of said container, a heating unit supported on said partition, a pan located above said partition, and a vibrator located below said partition, said pan being operatively connected to said vibrator to cause the vibration of said pan in said container above said partition.

9. A corn popper as set forth in claim 8 in which said container is provided with a yielding bottom and said vibrator is supported on said yielding bottom.

10. In a corn popper, a receptacle, a separate pan within said receptacle, heating means below said pan, and electrically actuatable means for vibrating said pan.

11. In a corn popper, a receptacle, a separate pan within said receptacle, electrical heating means below said pan, electrically actuatable means for vibrating said pan, and a common source of electrical energy for energizing said heating means and said vibrating means.

12. In a corn popper, a container having a resilient bottom plate member, a vibrator element mounted on said plate member, a resilient bracket mounted on the part of said vibrator element adjacent said plate member, an armature for said vibrator element displaceably mounted on said bracket, a separate pan in said container connected to said armature, and heating means in heat exchange relation with said pan.

13. In a corn popper, a container having a resilient bottom plate member, an electromagnet mounted on said plate member, a resilient bracket mounted on said electromagnet, an armature for said electromagnet displaceably mounted on said bracket, a separate pan in said container displaceably connected to said armature, a source of varying electrical current electrically connected to said electromagnet, and heating means in heat exchange relation with said pan.

14. In a corn popper, a container having a resilient bottom plate member, an electromagnet mounted on said plate member, a resilient bracket mounted on said electromagnet, an armature for said electromagnet displaceably mounted on said bracket, a separate pan in said container connected to said armature, electrical heating means in heat exchange relation with said pan, and a common source of varying electrical current electrically connected to said electromagnet and said heating means.

15. In a corn popper, a container having a bottom resilient plate member, a resilient bracket mounted on said plate member, a separate pan in said container, electrically actuatable vibrating means mounted on said bracket and in operable relation with said pan for vibrating said pan, and heating means in heat exchange relation with said pan.

ABE O. SAMUELS.